(12) United States Patent
Tamura et al.

(10) Patent No.: US 9,190,847 B2
(45) Date of Patent: Nov. 17, 2015

(54) POWER DISTRIBUTION SYSTEM DISTRIBUTING AN ALTERNATING CURRENT (AC) POWER AND A DIRECT CURRENT (DC) POWER TO LOAD DEVICES

(75) Inventors: Hideki Tamura, Shiga (JP); Takuya Kagawa, Kyoto (JP); Hiroaki Koshin, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 774 days.

(21) Appl. No.: 13/498,452

(22) PCT Filed: Sep. 28, 2010

(86) PCT No.: PCT/IB2010/002423
§ 371 (c)(1),
(2), (4) Date: Mar. 27, 2012

(87) PCT Pub. No.: WO2011/039599
PCT Pub. Date: Apr. 7, 2011

(65) Prior Publication Data
US 2012/0188806 A1 Jul. 26, 2012

(30) Foreign Application Priority Data

Sep. 30, 2009 (JP) ................................. 2009-227423

(51) Int. Cl.
*H02J 3/38* (2006.01)
(52) U.S. Cl.
CPC ............... *H02J 3/383* (2013.01); *Y02E 10/563* (2013.01)

(58) Field of Classification Search
CPC ....... H02J 3/383; Y02E 10/563; Y02E 10/566
USPC ............................................................ 307/31
See application file for complete search history.

(56) References Cited

U.S. PATENT DOCUMENTS

| | | | |
|---|---|---|---|
| 2004/0125626 A1* | 7/2004 | Kanouda et al. | 363/125 |
| 2005/0030772 A1* | 2/2005 | Phadke | 363/71 |
| 2007/0044837 A1* | 3/2007 | Simburger et al. | 136/292 |
| 2008/0029153 A1* | 2/2008 | Margalit | 136/252 |
| 2011/0121647 A1* | 5/2011 | Ragavanis | 307/19 |

FOREIGN PATENT DOCUMENTS

| | | |
|---|---|---|
| CN | 101436778 | 5/2009 |
| JP | 4128024 | 11/1992 |
| JP | 8182315 A | 7/1996 |
| JP | 1031525 A * | 2/1998 |
| JP | 2003204682 A | 7/2003 |

(Continued)

OTHER PUBLICATIONS

English Translation of the Chinese Search Report in a corresponding Chinese application No. 201080043443.9.

(Continued)

*Primary Examiner* — Jared Fureman
*Assistant Examiner* — Brett Squires
(74) *Attorney, Agent, or Firm* — Bacon & Thomas, PLLC

(57) ABSTRACT

A power distribution system includes a DC-DC converter which outputs a DC power after converting the DC power outputted from a DC power source to a desired voltage level. In the power distribution system, the DC-DC converter is controlled so as to operate only when the input voltage falls in a predetermined range.

7 Claims, 6 Drawing Sheets

(56) References Cited

FOREIGN PATENT DOCUMENTS

| | | |
|---|---|---|
| JP | 2003284245 | 10/2003 |
| JP | 200667757 A | 3/2006 |
| JP | 201041886 A | 2/2010 |
| TW | 200410471 A | 6/2004 |

OTHER PUBLICATIONS

International Search Report from PCT/IB2010/002423.
Chinese Office Action dated Jan. 13, 2015 issued in corresponding Chinese application No. 201080043443.9 and English Search Report thereof.

* cited by examiner

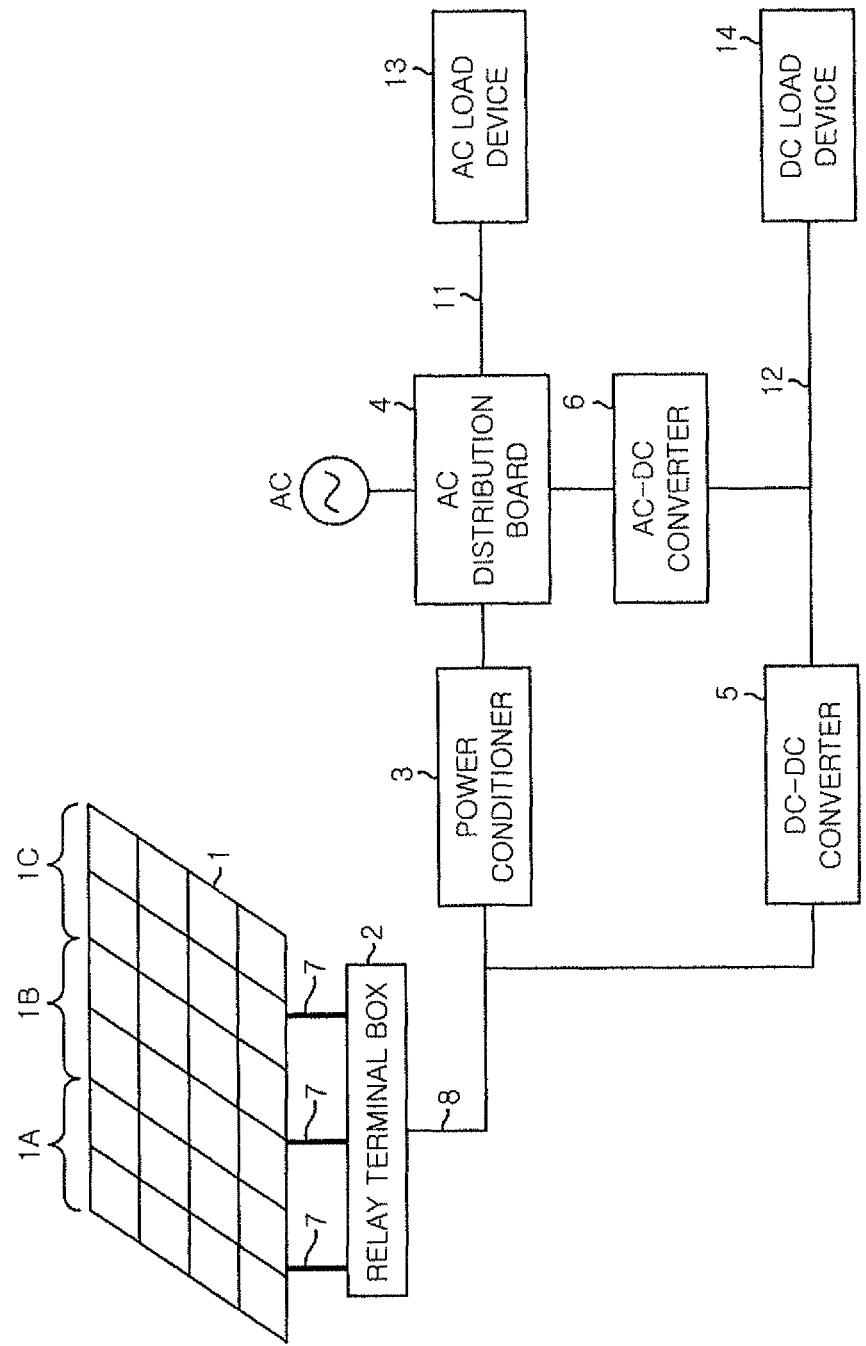

POWER DISTRIBUTION SYSTEM DISTRIBUTING AN ALTERNATING CURRENT (AC) POWER AND A DIRECT CURRENT (DC) POWER TO LOAD DEVICES

FIELD OF THE INVENTION

The present invention relates to a power distribution system which distributes an alternating current (AC) power and a direct current (DC) power to load devices.

BACKGROUND OF THE INVENTION

Conventionally, there is disclosed a power distribution system which distributes an AC power and a DC power in a building such as a house, a shop and an office building in, e.g., Patent document 1. The power distribution system of Patent document 1 includes a distribution board and AC power outlets. Further, DC output power terminals are provided in the AC power outlets, and a transformer and a rectifier are disposed in the distribution board.

In the distribution board, an AC voltage of 100 V or 200 V is converted into three types of AC voltages, e.g., 6 V, 3 V, and 1.5 V, through the transformer, and three types of DC voltages, e.g., 6 V, 3 V and 1.5 V, are acquired by rectifying the three types of AC voltages using a rectifier. The three types of DC voltages produced in the distribution board are distributed to the DC output power terminals.

From the viewpoint of the global environment protection, there has been proposed a power distribution system which performs grid-connected operation of a DC power generation equipment such as a solar power generation apparatus provided in the building and a commercial power source (i.e., an AC power) supplied from a power company (see, e.g., Patent document 2). In such a type of grid-connected system, a DC power generated by the DC power generation equipment is converted into an AC power by a power converter (power conditioner) for converting a DC power into an AC power, and is operated in conjunction with an AC power of the commercial power source. Further, when the power in excess of the power consumed by load in the building is supplied from the DC power generation equipment, a surplus power can be reversely supplied to the commercial electric power source, which is so-called selling of power.

Patent Documents

[Patent document 1] Japanese Utility Model Application Publication No. Hei 4-128024
[Patent document 2] Japanese Patent Application Publication No. 2003-284245

In a power distribution system described in Patent document 2, when a DC power is supplied as in Patent document 1, a DC power outputted from the DC power generation equipment such as a solar power generation apparatus is converted into an AC power in the power conditioner and the AC power is converted into the DC power again. For this reason, there occur the problems that the power loss is increased and the power efficiency is reduced due to the power conversion because two-stage power conversion is performed.

Further, in order to efficiently distribute an AC power and a DC power, the present applicant has proposed a configuration in which there are provided a power conditioner for converting a DC power outputted from the DC power generation equipment into an AC power and a DC-DC converter for converting a voltage level of the DC power outputted from the DC power generation equipment into a desired voltage level; and the AC power and the DC power are supplied from the power conditioner and the DC-DC converter, respectively.

With such configuration in which the power conditioner and the DC-DC converter are provided, the power conditioner and the DC-DC converter may be operated at the same time. In this case, the following problems arise. That is, when the DC-DC converter is operated in the state in which an amount of the power generated by the DC power generation equipment is small, it does not operate stably. Accordingly, the DC power is not stably supplied. Furthermore, if the operation of the DC-DC converter becomes unstable, the operation of the power conditioner may be disturbed.

SUMMARY OF THE INVENTION

In view of the above, the present invention provides a power distribution system for distributing an AC power and a DC power, which is capable of stably operating a DC-DC converter for outputting a DC power and supplying a stable DC power.

In accordance with a first aspect of the present invention, there is provided a power distribution system including a DC-DC converter which converts a DC power outputted from a DC power source into a DC power having a desired voltage level and outputs the DC power, wherein the DC-DC converter is controlled to operate only when an input voltage thereof falls within a predetermined range.

Further, the power distribution system may include: a power conditioner connected to the DC power source and an AC power system, the power conditioner serving to convert the DC power outputted from the DC power source into an AC power synchronized with a phase of the AC power system, output the AC power, and reversely supply the AC power to the AC power system; and an operation control part which performs a control so that the DC-DC converter operates only when the input voltage of the DC-DC converter falls within the predetermined range, wherein the power conditioner and the DC-DC converter may be connected in parallel to the DC power source, so that the power conditioner and the DC-DC converter can be simultaneously operated.

By this configuration, the DC-DC converter for outputting DC power can be stably operated, and stable DC power can be supplied.

Preferably, the predetermined range is equal to or narrower than an operating voltage range of the power conditioner.

By this configuration, when the DC-DC converter is operated while the power conditioner is being operated, the DC-DC converter can be operated in the state in which the input voltage is stabilized, thereby achieving stable operation. Furthermore, the DC-DC converter can be prevented from disturbing the operation of the power conditioner.

In the power distribution system, the operation control part may control the DC-DC converter to operate after the lapse of a predetermined time period from when the input voltage of the DC-DC converter enters the operating voltage range.

With such configuration, the operation of the power conditioner becomes stable, and then the DC-DC converter starts to operate, which leads into further stable operation of the DC-DC converter.

Further, the operation control part may control the DC-DC converter to operate when an amount of variation in the input voltage of the DC-DC converter per unit time is equal to or lower than a predetermined value.

With this configuration, it is checked whether or not the power conditioner operates stably, and then the DC-DC converter starts to operate, thereby further stabilizing the operation of the DC-DC converter.

The power distribution system may include a power failure detection unit which detects a power failure of the AC power system, wherein, when the power failure is detected by the power failure detection unit, the operation control part may widen the predetermined range to a larger range than that in a non-power failure situation and operates the DC-DC converter.

With such configuration, since the power conditioner stops operating during a power failure, the DC-DC converter can be operated within a wider range of the operating voltage regardless of the operation of the power conditioner. This makes it possible to more efficiently use the power generated by a DC power source such as solar cells.

Further, the power distribution system may include a power failure detection unit which detects a power failure of the AC power system, wherein, when the power failure is detected by the power failure detection unit, the operation control part may stop operation of the DC-DC converter.

By doing so, in a case where the power conditioner stops operating during the power failure and the DC-DC converter becomes difficult to operate stably, the DC-DC converter can be suppressed from operating unstably by stopping the operation thereof.

Preferably, the DC power source includes solar cells, and the operation control part changes a setting of the operating voltage range based on the number of the solar cells installed.

With such configuration, the DC-DC converter can be operated within an appropriate operating voltage range based on the peak voltage of the power generated by the solar cells.

In accordance with a second aspect of the present invention, there is provided a DC power distribution apparatus including: a DC-DC converter which converts a DC power outputted from a DC power source into a DC power having a desired voltage level and outputs the DC power, the DC-DC converter being connected to the DC power source in parallel with a power conditioner which converts the DC power outputted from the DC power source into an AC power synchronized with a phase of an AC power system and outputs the AC power, so that the DC-DC converter can be operated simultaneously with the power conditioner; and an operation control part which controls the DC-DC converter to operate only when an input voltage of the DC-DC converter falls within a predetermined range.

BRIEF DESCRIPTION OF THE DRAWINGS

The objects and other features of the present invention will become apparent from the following description of embodiments, given in conjunction with the accompanying drawings, in which:

FIG. 1 is a diagram illustrating the configuration of a power distribution system in accordance with an embodiment of the present invention;

DETAILED DESCRIPTION OF THE EMBODIMENTS

Figure 2A:
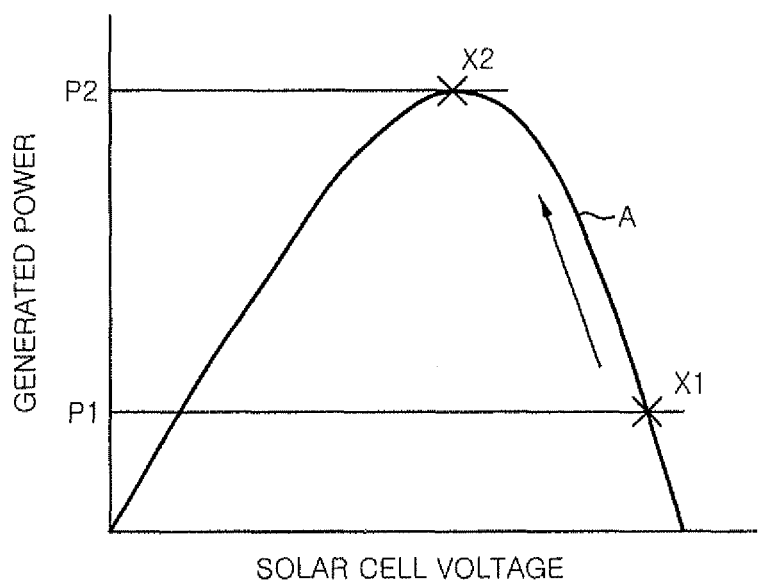
FIGS. 2A and 2B are diagrams for explaining operation of a power conditioner.

Hereinafter, embodiments of the present invention will be described in more detail with reference to accompanying drawings which form a part hereof. Throughout the drawings, like reference numerals will be given to like parts.

An embodiment in which a power distribution system in accordance with an embodiment of the present invention is applied to a detached house will be described in detail with reference to the accompanying drawings. However, the building to which the power distribution system in accordance with the present invention is applied is not limited to the detached house, but the power distribution system may be applied to each house of a multiple dwelling house or an office building.

FIG. 1 illustrates a configuration of a power distribution system in accordance with an embodiment of the present invention. The power distribution system in accordance with the embodiment includes solar cells 1, a relay terminal box (hereinafter, also referred to as a "connection box") 2, a power conditioner 3, an AC distribution board 4, a DC-DC converter 5, and an AC-DC converter 6.

The solar cells 1 include multiple (e.g., three in the illustrated example) solar cell modules 1A, 1B and 1C, and serve as a DC power source. The relay terminal box 2 integrates a plurality of output cables 7 into a single cable 8, the solar cell modules 1A, 1B and 10 supplying DC output through output cables 7. A solar power generation apparatus including the solar cells 1 and the relay terminal box 2 serves as an example of a DC power generation equipment.

The power conditioner 3 converts the DC power outputted from the solar cells 1 into an AC power in synchronization with a phase of a commercial power source (AC power system) AC, and reversely supplies the AC power to the AC power system. The AC distribution board 4 branches the AC power outputted from the AC power system or the power conditioner 3, and distributes an electric power to houses via a plurality of branch breakers (not shown).

The DC-DC converter 5 converts a voltage level of the DC power outputted from the solar cells 1 into a desired voltage level. The AC-DC converter 6 converts the AC power supplied via the AC distribution board 4 into the DC power with a desired voltage level. Furthermore, an AC load device 13 is connected to an AC distribution line 11 which distributes the AC power outputted from the AC distribution board 4. A DC load device 14 is connected to a DC distribution line 12 which distributes the DC power outputted from the DC-DC converter 5 or the AC-DC converter 6.

The solar cell modules 1A~1C have a conventional well-known configuration in which multiple (e.g., eight in the illustrated example) solar cells enclosed with an envelope (not shown) are installed, e.g., on the roof of the house. Further, the relay terminal box 2 is provided in a closed box shape in which strings at an output side and a load side are relayed through terminals and a reverse current blocking device and a DC switch are provided if necessary (e.g., see Japanese Industrial Standard C8960).

The power conditioner 3 includes a step-up chopper circuit (not shown) which steps up a DC output of the solar cells 1, an inverter (not shown) which converts the DC output stepped up by the step-up chopper circuit into an AC sine-wave output in synchronization with the phase of the AC power system, an inverter control circuit (not shown) which adjusts the AC output by controlling the inverter, and a grid connection protection device.

The AC distribution board 4 is provided as a box with a door, like a so-called household distribution board (a house board). In the box, a main breaker (not shown) which primary side is connected to the AC power system, and a plurality of branch breakers branched to conductive bars (not shown) are accommodated, the conductive bars being connected to a secondary side of the main breaker. Further, an output line of the power conditioner 3 is taken into the box of the AC distribution board 4, and is connected in parallel with the AC power system AC in the box. Furthermore, the AC distribution line 11 is connected to a secondary side of the branch breaker, and the AC power is supplied to a AC load device 13 provided in the house via the AC distribution line 11. An outlet (not shown) to which the AC load device 13 is connected is provided at the end of the AC distribution line 11.

The DC-DC converter 5 includes, for example, a switching regulator, and converts the voltage level of the DC power outputted from the solar cells 1 into a desired voltage level by performing the constant voltage regulation which detects an output voltage and increases or decreases the output voltage so that the detected output voltage becomes equal to a target voltage (feedback control). The AC-DC converter 6 includes, for example, a switching regulator, an inverter, etc., and converts the AC power outputted from the AC distribution board 4 to a DC power having a desired voltage level by rectifying the AC voltage into the DC voltage and performing the constant voltage regulation on an output voltage.

The output terminals of the DC-DC converter 5 and the AC-DC converter 6 are connected to the DC distribution line 12, and a protection circuit (not shown) is provided on the DC distribution line 12. Further, one of the DC powers converted to have the desired voltage level by the DC-DC converter 5 and the AC-DC converter 6 is supplied to the DC load device 14 via the DC distribution line 12. A DC power distribution apparatus including, e.g., the DC-DC converter 5 and the AC-DC converter 6, may be provided to output a DC power. An outlet (not shown) to which the DC load device 14 is connected is provided at the end of the DC distribution line 12.

In the present embodiment, the power conditioner 3 is connected in parallel with the DC-DC converter 5, so that the power conditioner 3 and the DC-DC converter 5 can be operated simultaneously. Further, the DC-DC converter 5 is operated only when the input voltage falls within a predetermined range.

Figure 2B:
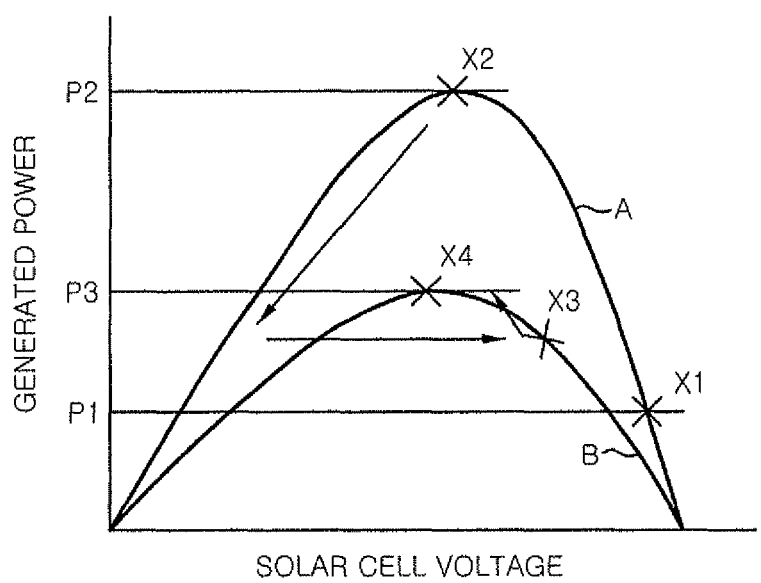

Next, in the power distribution system in accordance with the present embodiment, operation of the power conditioner 3 will be described. FIGS. 2A and 2B are graphs for explaining the operation of the power conditioner 3.

The inverter control circuit of the power conditioner 3 performs Maximum Power Point Tracking (MPPT) control in which, when an output voltage or an output current of the solar cells 1 is changed due to a change in the temperature of the solar cells 1 or the intensity of solar radiation, the operating point of the solar cells 1 moves to follow up the maximum output point, thereby maximizing the DC output of the solar cells 1. Since the MPPT control is well known, a detailed description thereof will be omitted. Furthermore, the grid connection protection device of the power conditioner 3 monitors a voltage of the AC power system, and reduces the output of the inverter by sending a command to the inverter control circuit to stop MPPT control when the voltage is higher than an appropriate value, thereby suppressing an increase in a grid voltage.

The curve A shown in FIG. 2A illustrates an output characteristic of the solar cells 1 under a specific solar radiation condition. An output power P1 is the power (demanded DC power) supplied from the DC-DC converter 5 via the DC distribution line 12 to the DC load device 14. Initially, an operating point of the inverter control circuit is determined as X1 based on the demanded DC power P1. When the inverter control circuit starts MPPT control and adjusts an AC power supplied to the AC distribution line 11, the operating point moves to X2 coinciding with the peak of the output characteristic curve A, and the solar cells 1 supplies the maximum output (e.g., the maximum power P2 in FIG. 2A).

At this point, the difference (P2−P1) between the maximum power P2 and the demanded DC power P1 is supplied to the AC load device 13 via the AC distribution line 11. Here, when the supply power (P2−P1) of the power conditioner 3 is lower than a consumed power of the AC load device 13, an AC power from the AC power system AC is supplied to the AC load device 13 via the AC distribution line 11. Meanwhile, when the supply power (P2−P1) of the power conditioner 3 is higher than the consumed power of the AC load device 13, the excess of the AC power (P2−P1) is reversely supplied to the AC power system from the power conditioner 3.

On the other hand, as shown in FIG. 2B, when the output characteristic of the solar cells 1 decreases from curve A to curve B because of the weakening of solar radiation and, accordingly, the output power of the solar cells 1 is lower than the demanded DC power P1, the inverter control circuit stops the operation. In this case, the DC load device 14 stops the operation, or the DC load device 14 is supplied with a power from an auxiliary power source (battery or the like) separately provided.

Meanwhile, if the output power of the solar cells 1 is higher than the demanded DC power P1 even when the output characteristic of the solar cells 1 decreases from the curve A to the curve B, the inverter control circuit decreases the output of the solar cells 1 by shifting the operating point from X1 to X3. Thereafter, the operating point reaches X4 which coincides with the peak of the output characteristic curve B by second MPPT control and the maximum output (maximum power P3) is supplied from the solar cells 1. Further, even when the demanded DC power P1 changes, the maximum output can be supplied from the solar cells 1 by readjusting the MPPT control, as in the case when the solar radiation changes which is described above.

The power distribution system in accordance with the present embodiment distributes to the AC load device 13 the AC power supplied from the AC power system via the AC distribution board 4 or the AC power outputted from the power conditioner 3. Further, the power distribution system distributes to the DC load device 14 the DC power from the solar cells 1 controlled at a constant voltage by the DC-DC converter 5, or the DC power obtained by converting the AC power supplied from the AC distribution board 4 using the AC-DC converter 6. This makes it possible to more efficiently distribute the DC power as compared to the case where an AC power outputted from the power conditioner 3 is converted into a DC power and then the DC power is distributed.

Further, since the power conditioner 3 and the DC-DC converter 5 are connected in parallel with respect to the solar cells 1, the distribution of the output power of the solar cells 1 to the DC load and the AC load is automatically adjusted in response to a change in solar radiation or DC load (i.e., a demanded DC power). In this case, the DC power is first supplied to the DC load device 14 via the DC-DC converter 5, and then is supplied to the AC load device 13 as the AC power by the power conditioner 3, and finally is supplied to the AC power system as the AC power. As described above, even when the DC load or AC load changes, the DC power outputted from the solar cells 1 is automatically distributed to the DC load device 14, the AC load device 13 and the AC power system AC, thereby improving power efficiency.

Next, the operation of the DC-DC converter 5 in the power distribution system of the present embodiment will be described.

Figure 3:
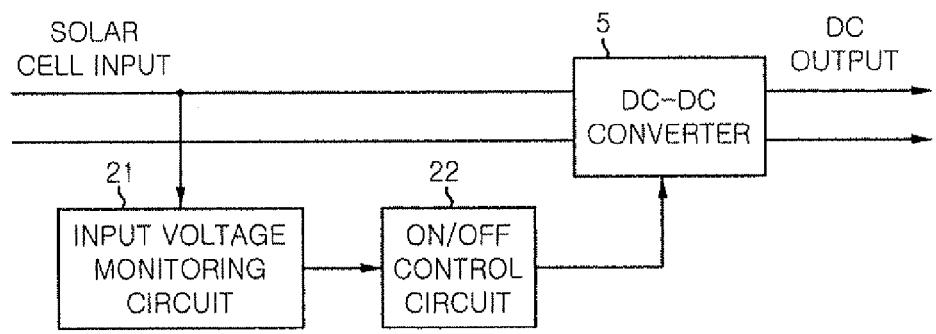
FIG. 3 is a diagram depicting a first configuration example of an operation control part which controls operation of the DC-DC converter in accordance with the embodiment.

FIG. 3 represents a first configuration example of a operation control part which controls the operation of the DC-DC converter 5 in accordance with the present embodiment. The operation control part in accordance with the first configuration example includes an input voltage monitoring circuit 21 and an ON/OFF control circuit 22. The input voltage monitoring circuit 21 monitors by detecting a voltage inputted to the DC-DC converter 5 from the solar cells 1, i.e., an output voltage of a DC power generated by the solar cells 1.

The ON/OFF control circuit 22 turns on and off operation of the DC-DC converter 5 by outputting a control signal to the DC-DC converter 5 based on the results of the detection of the input voltage monitoring circuit 21. Specifically, the ON/OFF control circuit 22 performs an operation control in such a way that the DC-DC converter 5 is turned on if the voltage inputted to the DC-DC converter 5 is within a predetermined range and is turned off if the input voltage deviates from the predetermined range. The input voltage monitoring circuit 21 and the ON/OFF control circuit 22 may be configured to be provided inside or outside the DC-DC converter 5.

Figure 4:
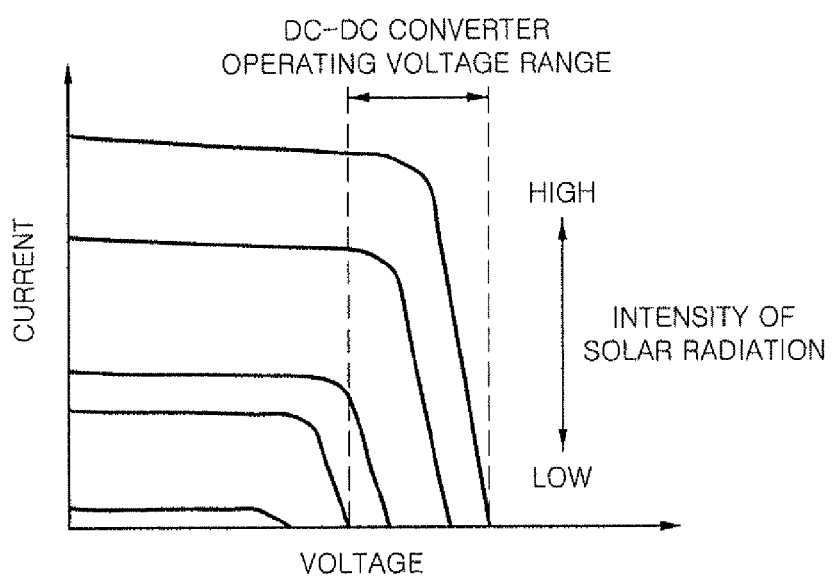
FIG. 4 is a graph illustrating a first example of an operating range of the DC-DC converter controlled by the operation control part in the first example of the configuration.

FIG. 4 is a graph illustrating a first example of an operating range of the DC-DC converter 5 which is controlled by the operation control part of the first configuration example shown in FIG. 3. FIG. 4 illustrates a relation between voltage and current in the output power of the solar cells 1 and a voltage range in which the DC-DC converter 5 operates. The output voltage and current of the solar cells vary depending on a change in the intensity of solar radiation. For example, a high voltage and current are outputted when the intensity of solar radiation is high.

In the present embodiment, the predetermined range of the high-voltage side within which the maximum output power can be obtained from the solar cells 1 is set as the operating voltage range of the DC-DC converter 5, and the DC-DC converter 5 is operated by the ON/OFF control circuit 22 when the input voltage is within the operating voltage range. When the intensity of solar radiation to the solar cells is low, for example, at dawn or at dusk, an amount of power generated is small and, accordingly, the output voltage is low and unstable.

When the DC-DC converter 5 is operated in the state in which the amount of power generated by the DC power generation equipment is low, there may be cases where the operation becomes unstable and the DC power is not supplied stably. With the present embodiment, since the predetermined range in which the input voltage is higher than the predetermined voltage is set as the operating voltage range, the DC-DC converter 5 can be stably operated and the stable DC power can be supplied. Furthermore, the DC-DC converter 5 does not disturb the operation of the power conditioner 3.

Figure 5:
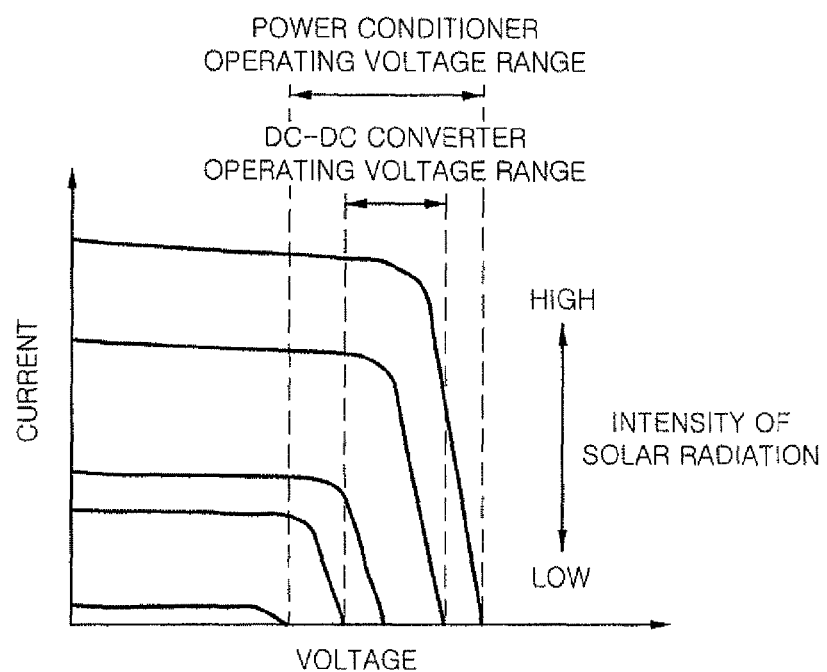
FIG. 5 is a graph representing a second example of the operating range of the DC-DC converter controlled by the operation control part in the first example of the present embodiment.

FIG. 5 is a graph illustrating a second example of the operating range of the DC-DC converter 5 which is controlled by the operation control part of the first configuration example shown in FIG. 3. As shown in FIG. 5, the operating voltage range of the DC-DC converter 5 is set to a range identical to or narrower than an operating voltage range of the power conditioner 3, and the DC-DC converter 5 is operated by the ON/OFF control circuit 22 when the input voltage is within the set operating voltage range. When the power conditioner 3 operates, the output voltage of the solar cells 1, i.e., the input voltage of the DC-DC converter 5, is stabilized by the above-described MPPT control, and therefore the DC-DC converter 5 can be stably operated.

The operation of the DC-DC converter 5 may be controlled based on the time and/or the range of a variation in voltage, in addition to the operating voltage range. Such modified examples will be described below.

In a first modified example, the ON/OFF control circuit 22 includes a timer for counting time, and starts to operate the DC-DC converter 5 after a predetermined time period has passed from the time when the input voltage enters the predetermined operating voltage range of the DC-DC converter 5. Accordingly, after the power conditioner 3 is operated, the DC-DC converter 5 can be operated.

Further, when the input voltage is lower than a minimum operating voltage of the operating voltage range after the DC-DC converter 5 has operated, the operation is immediately stopped. After that, even when the input voltage is returned to within a normal voltage range, the operation is kept stopped, and the operation is resumed after the lapse of a predetermined time period. Thus, since the DC-DC converter 5 starts to operate after the power conditioner 3 has stably operated, the operation of the DC-DC converter 5 can be further stabilized. Furthermore, there is no concern about the power conditioner 3 disturbing the stable operation of the DC-DC converter 5.

In a second modified example, the ON/OFF control circuit 22 monitors the input voltage of the DC-DC converter 5 using the detection result of the input voltage monitoring circuit 21, and starts the operation when an amount of a change in the input voltage per unit time (e.g., the range of the change in the input voltage) becomes equal to or lower than a predetermined value. Accordingly, it is possible to check the power conditioner 3 for the operation and then operate the DC-DC converter 5.

Figure 6:
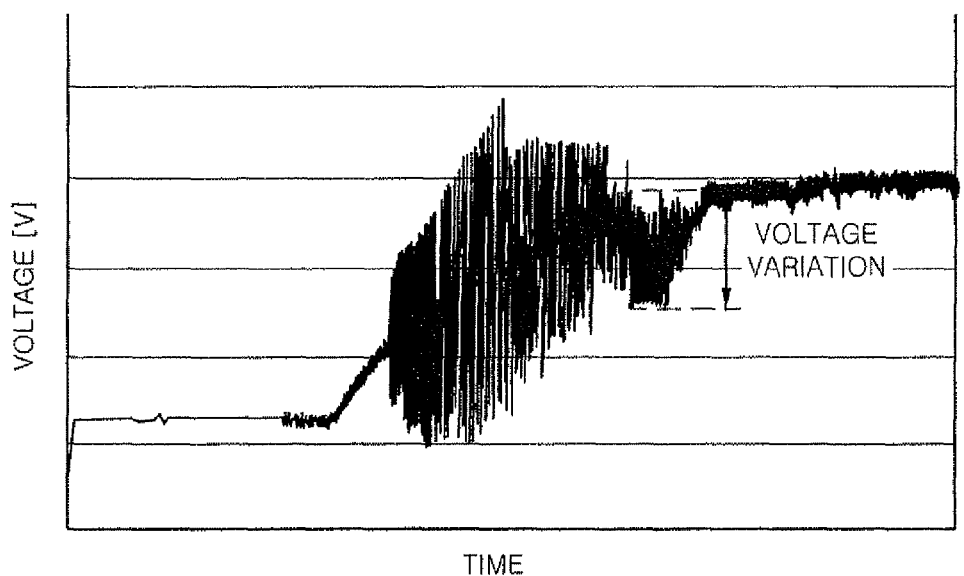
FIG. 6 is a diagram depicting a first example of an input voltage waveform in controlling the operation of the DC-DC converter.

FIG. 6 is a diagram depicting a first example of an input voltage waveform regarding the operation control of the DC-DC converter 5. As shown in FIG. 6, the range of variation in input voltage is large when the input voltage of the DC-DC converter 5 increases, and then is reduced by the operation of the power conditioner 3. In this case, the input voltage of the DC-DC converter 5 is monitored, and the operation thereof is turned on when it is determined that the range of the input voltage per unit time is equal to or lower than a predetermined value.

Figure 7:
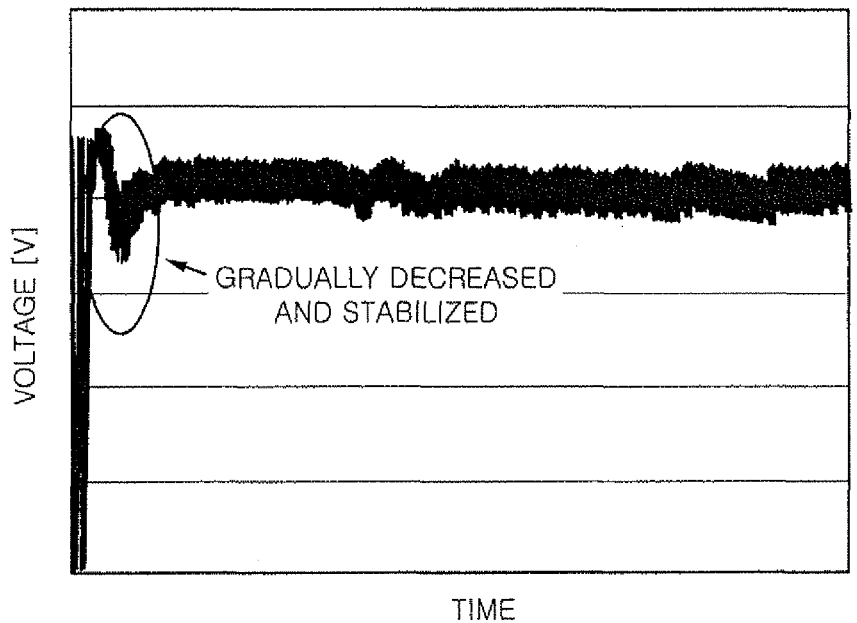
FIG. 7 is a diagram illustrating a second example of the input voltage waveform in controlling the operation of the DC-DC converter.

FIG. 7 is a diagram illustrating a second example of an input voltage waveform regarding the operation control of the DC-DC converter. The second example of FIG. 7 shows a situation in which when the input voltage of the DC-DC converter 5 increases, the input voltage is raised at first and gradually reduced and stabilized by the operation of the power conditioner 3. In this case, when it is determined that the input voltage is raised and then gradually reduced, the operation of the DC-DC converter 5 is turned on.

As described above, when the range of variation in the input voltage of the DC-DC converter 5 is equal to or lower than the predetermined value, the DC-DC converter 5 is operated. It is possible to check the power conditioner 3 for stable operation using the input voltage and then operate the DC-DC converter 5. Accordingly, the DC-DC converter 5 can be operated more stably.

Figure 8:
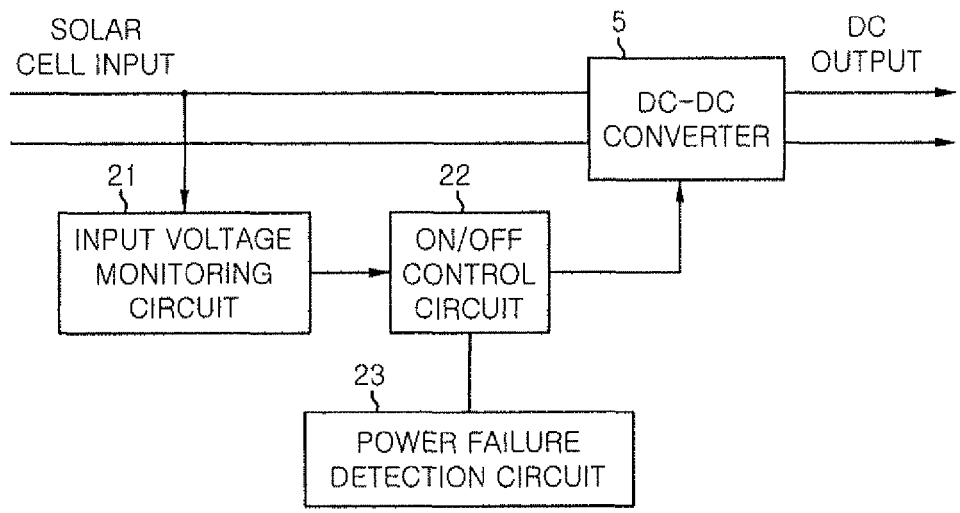
FIG. 8 is a diagram representing a second configuration example of the operation control part which controls the operation of the DC-DC converter in accordance with the embodiment.

FIG. 8 represents an second configuration example of the operation control part which controls the operation of the DC-DC converter 5 in accordance with the present embodiment. In the second configuration example, the operation control part includes an input voltage monitoring circuit 21, an ON/OFF control circuit 22 and a power failure detection circuit 23 having a power failure detection function. The power failure detection circuit 23 is connected to a supply line through which the AC power is supplied from the AC power system to the AC distribution board 4 and the AC distribution line 11, and detects the power failure of the AC power system.

The ON/OFF control circuit 22 controls the operation of the DC-DC converter 5 based on the results of the detection of the input voltage monitoring circuit 21 so that the DC-DC converter 5 is turned on when the input voltage of the DC-DC converter 5 falls within a predetermined range. Furthermore, the ON/OFF control circuit 22 controls the operation of the DC-DC converter 5 based on the results of the detection of the power failure detection circuit 23. For example, the ON/OFF control circuit 22 performs one of first and second control examples to control the operation of the DC-DC converter 5 in the event of a power failure, which will be described below.

In the first control example, when a power failure is detected, the operating voltage range of the DC-DC converter 5 is widened compared to that in a non-power-failure situation, and then the DC-DC converter 5 is operated in the wide voltage range. Since the operation of the power conditioner 3 stops during the power failure, the power generated by the solar cells 1 can be effectively utilized by operating the DC-DC converter 5 in the wider range regardless of the operation of the power conditioner 3. In this case, i.e., in the event of a power failure, the power can be supplied by distributing the DC power from the solar cells 1.

Meanwhile, in the second control example, when a power failure is detected, the operation of the DC-DC converter 5 is stopped. Since the operation of the power conditioner 3 stops during the power failure, the DC-DC converter 5 may be difficult to stably operate. Therefore, the unstable operation of the DC-DC converter 5 can be suppressed by stopping the operation thereof.

Furthermore, in each above-described example of the configuration and operation of the present embodiment, the setting of the operating voltage range of the DC-DC converter 5 may be changed, and the operating voltage range may be changed according to the number of solar cells 1 installed (a peak voltage of the amount of power generated). In this case, the operating voltage range of the DC-DC converter 5 on which the ON/OFF control circuit 22 performs an ON/OFF control is previously set according to the number of solar cells 1 installed (e.g., the number of solar cells installed in series) when the power distribution system is installed. Thus, it is possible to operate the DC-DC converter 5 in an appropriate operating voltage range according to the peak voltage of the amount of power generated by the solar cells 1.

Figure 9:
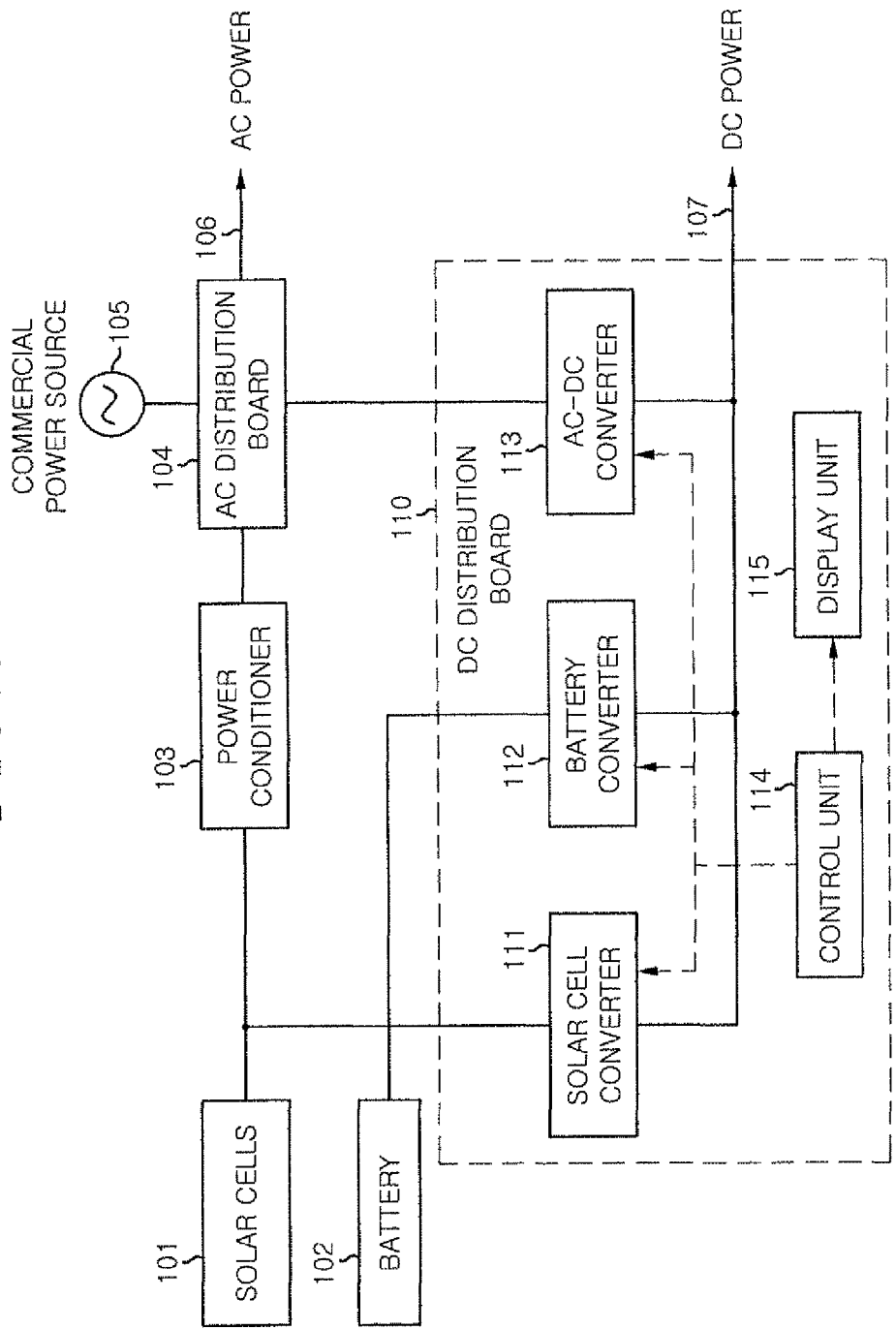
FIG. 9 is a diagram illustrating an application example of the power distribution system in accordance with the embodiment.

Next, an application example will be described in which the power distribution system of the present embodiment is applied to a hybrid power distribution system which includes solar cells and a battery and distributes an AC power and a DC power. FIG. 9 illustrates an application example of the power distribution system in accordance with the present embodiment.

The power distribution system of the application example includes an AC distribution board 104 for distributing an AC power to an AC load device via an AC distribution line 106, and a DC distribution board 110 as a DC distribution device which distributes a DC power to a DC load device via a DC distribution line 107. A commercial power source (AC power system) 105 as an AC power source and a power conditioner 103 are connected to the input terminals of the AC distribution board 104, and the AC distribution line 106 and the DC distribution board 110 are connected to the output terminals of the AC distribution board 104. The AC distribution board 104 branches the AC power supplied from the commercial power source 105 or the power conditioner 103, and outputs to the AC distribution line 106 and the DC distribution board 110.

Further, there are provided solar cells 101 which receive solar light, generate a DC power by performing photoelectric conversion on the solar light, and output the DC power, and a battery 102 formed of a secondary battery capable of storing a DC power and outputting the stored DC power, as the DC power sources of the power distribution system. The solar cells 101, the battery 102 and the AC distribution board 104 are connected to the input terminals of the DC distribution board 110, and the DC distribution line 107 is connected to the output terminal of the DC distribution board 110. The DC distribution board 110 includes a solar cell converter 111, a battery converter 112, an AC-DC converter 113, a control unit 114, and a display unit 115.

The output line of the solar cells 101 is branched, and is then connected to the power conditioner 103 and the solar cell converter 111 of the DC distribution board 110. The power conditioner 103 converts the DC power outputted from the solar cells 101 into the AC power synchronized with the phase of the commercial power source 105, and reversely supplies the AC power to the commercial power source 105. The solar cell converter 111 includes a DC-DC converter; and converts the DC power outputted from the solar cells 101 into a DC power having a desired voltage level and outputs the resulting DC power. The battery converter 112 includes a DC-DC converter; and converts the DC power outputted from the battery 102 into a DC power having a desired voltage level and outputs the resulting DC power. The AC-DC converter 113 converts the AC power supplied from the AC distribution board 104 into a DC power having a desired voltage level, and outputs the DC power.

The control unit 114 includes an information processing device such as a microcomputer or the like, and is responsible for the control of the operations of the respective components of the DC distribution board 110. The control unit 114 performs the ON/OFF control of the operations of the solar cell converter 111, the battery converter 112 and the AC-DC converter 113. Further, the control unit 114 performs the control of the output voltage, and the control of display of the display unit 115. The display unit 115 includes an liquid crystal display device, and displays various types of information, such as the operating status of the DC distribution board 110, using a character(s), a numeral(s), and/or an image(s) based on the instructions of the control unit 114.

In such power distribution system, the DC-DC converter can be stably operated and the DC power can be stably supplied, by applying the configuration of the above-described present embodiment to the DC-DC converter of the solar cell converter 111.

In the above-described embodiment, although the configuration in which the solar power generation apparatus includes solar cells as a DC power source is illustrated, the present invention is not limited thereto, but the present invention may be applied to other DC power generation equipment such as a fuel cell power generation apparatus including fuel cells. It is apparent that the above embodiments and modified examples can be combined with each other.

While the invention has been shown and described with respect to the embodiments, the present invention is not limited thereto. It will be understood by those skilled in the art that various changes and modifications may be made without departing from the scope of the invention as defined in following claims.

What is claimed is:

1. A power distribution system comprising:
    a DC-DC converter which converts a DC power outputted from a DC power source into a converted DC power having a desired voltage level and outputs the converted DC power;
    a power conditioner connected to the DC power source and an AC power system, the power conditioner serving to convert the DC power outputted from the DC power source into an AC power synchronized with a phase of the AC power system, output the AC power, and reversely supply the AC power to the AC power system; and
    an operation control part which performs a control so that the DC-DC converter operates only when an input voltage of the DC-DC converter falls within an predetermined range,
    wherein the power conditioner and the DC-DC converter are connected in parallel to the DC power source, so that the power conditioner and the DC-DC converter can be simultaneously operated,
    wherein the predetermined range is equal to or narrower than an operating voltage range of the power conditioner, and
    wherein the power distribution system further comprises a power failure detection unit which detects a power failure of the AC power system,
    wherein, when the power failure is detected by the power failure detection unit, the operation control part widens the predetermined range to a larger range than that in a non-power failure situation and operates the DC-DC converter.

2. The power distribution system of claim 1, wherein the operation control part controls the DC-DC converter to operate after the lapse of a predetermined time period from the time when the input voltage of the DC-DC converter enters the predetermined range.

3. The power distribution system of claim 1, wherein the operation control part controls the DC-DC converter to operate when an amount of variation in the input voltage of the DC-DC converter per unit time is equal to or lower than a predetermined value.

4. The power distribution system of claim 1,
    further comprising an AC-DC converter connected between the power conditioner and a DC load device, wherein the DC-DC converter supplies the converted DC power to the DC load device and the power conditioner supplies the AC power to the DC load device via the AC-DC converter.

5. The power distribution system of claim 1,
    wherein the predetermined range is narrower than the operating voltage range of the power conditioner.

6. A DC power distribution apparatus comprising:
    a DC-DC converter which converts a DC power outputted from a DC power source into a converted DC power having a desired voltage level and outputs the converted DC power, the DC-DC converter being connected to the DC power source in parallel with a power conditioner which converts the DC power outputted from the DC power source into an AC power synchronized with a phase of an AC power system and outputs the AC power, so that the DC-DC converter can be operated simultaneously with the power conditioner; and
    an operation control part which controls the DC-DC converter to operate only when an input voltage of the DC-DC converter falls within a predetermined range,
    wherein the predetermined range is equal to or narrower than an operating voltage range of the power conditioner,
    wherein the DC power distribution apparatus further comprises a power failure detection unit which detects a power failure of the AC power system,
    wherein, when the power failure is detected by the power failure detection unit, the operation control part widens the predetermined range to a larger range than that in a non-power failure situation and operates the DC-DC converter.

7. The DC power distribution apparatus of claim 6, 6 wherein the predetermined range is narrower than the operating voltage range of the power conditioner.

* * * * *